(12) United States Patent
Patterson

(10) Patent No.: US 7,474,334 B1
(45) Date of Patent: Jan. 6, 2009

(54) MULTISPECTRAL IMAGING SYSTEM AND METHODS OF USE

(75) Inventor: Richard H. Patterson, Vista, CA (US)

(73) Assignee: Micro USA, Inc., Poway, CA (US)

( * ) Notice: Subject to any disclaimer, the term of this patent is extended or adjusted under 35 U.S.C. 154(b) by 918 days.

(21) Appl. No.: 10/799,156

(22) Filed: Mar. 12, 2004

Related U.S. Application Data (60) Provisional application No. 60/454,927, filed on Mar. 14, 2003.

(51) Int. Cl.
*H04N 5/225* (2006.01)
*H04N 7/18* (2006.01)
*G06K 9/00* (2006.01)

(52) U.S. Cl. ........................ 348/207.99; 348/81; 382/100

(58) Field of Classification Search ............... 348/81, 348/123
See application file for complete search history.

(56) References Cited

U.S. PATENT DOCUMENTS

| | | | | |
|---|---|---|---|---|
| 5,771,318 A * | 6/1998 | Fang et al. | ............... | 382/261 |
| 6,005,959 A * | 12/1999 | Mohan et al. | ............... | 382/110 |
| 6,304,664 B1 * | 10/2001 | Silva et al. | ............... | 382/100 |
| 6,606,120 B1 * | 8/2003 | Merrill et al. | ............... | 348/273 |
| 7,164,444 B1 * | 1/2007 | Merrill | ............... | 348/308 |

* cited by examiner

*Primary Examiner*—Luong T Nguyen
(74) *Attorney, Agent, or Firm*—Gordon & Rees LLP (57) ABSTRACT

The multispectral imaging system provides detection of low contrast objects on or below the surface of a body of water through the elimination of most of the surface reflected light clutter components from multispectral images. The images are processed by taking the weighted difference of two or more spectral components and applying a demeaning or whitening filter to the result. The images can then be frame averaged where the appropriate corrections for motion, magnification, rotation, and translation have been applied. The resultant imagery can then be displayed to an operator or transmitted to a remote location.

6 Claims, 7 Drawing Sheets

PRIOR ART

FIG. 1B

PRIOR ART

MULTISPECTRAL IMAGING SYSTEM AND METHODS OF USE

CROSS-REFERENCE TO RELATED PATENT APPLICATIONS

This application is a continuation-in-part of provisional patent application Ser. No. 60/454,927 filed 14 Mar. 2003

TECHNICAL FIELD

The present invention is in the field of electronic imaging. More particularly in the area of multispectral surveillance imaging systems for identifying objects on the surface or under the water.

BACKGROUND OF THE INVENTION

The detection and identification of low contrast objects on or below the surface of the ocean has a multitude of commercial applications from detecting dolphin free schools of tuna to counting salmon on the rivers and estuaries of the northwest. Additional uses include the location of debris from maritime and aircraft accidents and the possible location of maritime survivors in a search and rescue operation. Military applications obviously include the detection and location of subsurface threats such as mines, and the avoidance of navigational hazards, such as reefs and shoals. Recent applications in the area of homeland security include the monitoring of harbors, rivers, and lakes for towed contraband and subsurface intrusion by divers.

Optimum processing of ocean imagery for this purpose requires spatial and temporal registration of the image sensor over the entire imaged field of view. Spatial or temporal image mis-registration decorrelates the images and results in a loss of processing gain. Any loss of processing gain results in the reduced ability to detect low contrast targets in the high background imagery of the ocean's surface. Processing gains of at least 33 dB are possible for a two-color multispectral image. The processing three or more colors can yield an additional 6 dB of gain.

Figure 1A:
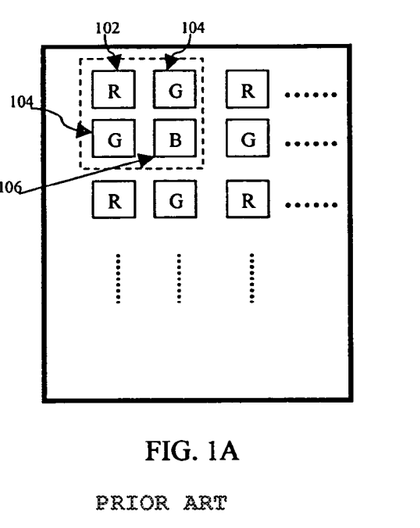
FIG. 1A is an illustration of a single camera single sensor imager.

Prior techniques include the use of multiple cameras, single cameras with multiple sensor arrays, and single cameras with a single sensor array. Prior single cameras such as camcorders or digital cameras with single sensor arrays impart both spatial and temporal image mis-registration since the color mosaic (FIG. 1A) is affixed to the sensor. A color 'pixel' is comprised of the 4 subpixels 102, 104, and 106 shown within the dotted lines. The subpixels do not image the same points on the water; hence give rise to spatial misregistration. A spatial mis-registration of one sub-pixel has been shown to produce a 10 dB loss of processing gain. If the sub-pixels are not sampled simultaneously, a temporal misregistration will result. A difference in the temporal sampling of the pixels imparts a loss of correlation between the channels. For every factor of ten in the temporal difference (10 milliseconds instead of 1 millisecond) the correlation will lose a factor of ten (0.9 instead of 0.99) and the processing gain will lose 20 dB, with a resultant reduction in the object detection depth capability.

Figure 1B:
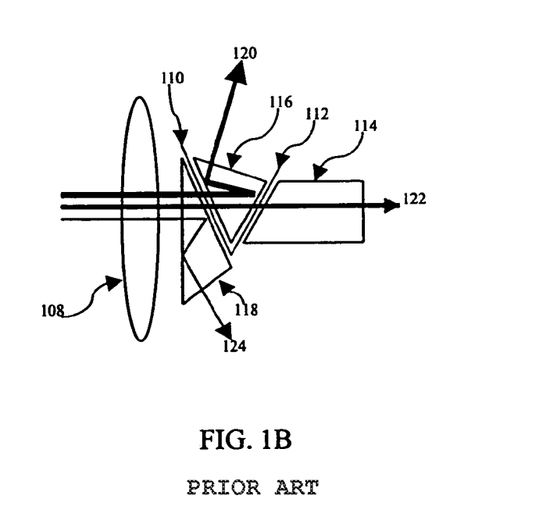
FIG. 1B is an illustration of a single camera multiple sensor imager.

A single camera with multiple sensors (FIG. 1B) imparts the mis-registration at the time the sensors are affixed to a beam splitter or prism. As shown in FIG. 1B, the three light components 120, 122, and 124 are spectrally separated into red (122), green (120), and blue (124) through the use of dichroic filters 110 and 112, and prisms 114, 116 and 118. Although dichroic filters can be manufactured with minimal polarization, the multiple reflections in prisms 116 and 118 create a light output that is polarized, primarily in the green and blue channels, while the red channel is relatively unpolarized. This difference can result in a loss of processing gain of up to 9 dB if used for the present application.

The use of two cameras requires that both lenses have the same magnification, f-number and focus. Furthermore, some mechanical means of aligning the images to register the same image plane is required in pitch, roll, and yaw. In general, due to coma and other lens effects, this can only be accomplished over 80% of the image for arrays with pixels on the order of 50 or more microns. Alignment to 4 microns is difficult to attain and a re-alignment must be done on a daily basis. Modern sensors have pixels on the order of 9 microns, so it becomes virtually impossible to maintain image registration to less than ½ of a pixel without a subsequent loss of processing gain of 5 dB.

Images of the ocean's surface contain several clutter components; light scatter in the atmosphere between the camera and the ocean surface, glint or light reflection from the water surface, hemispherical light scatter from the atmosphere above the ocean, and light from the upwelling irradiance of the water with and without an object.

Consequently there is a need for a multispectral imaging system that has both spatial and temporal registration over the entire imaged field of view as well as being able to reduce or eliminate atmospheric and hemispheric light scatter, light reflection from the waters surface as well as upwelling irradiation from the water.

DETAILED DESCRIPTION OF THE INVENTION

The multispectral littoral surveillance system (MLSS) is a system for the detection of low contrast objects on or below the surface of the ocean through the elimination of most of the surface reflected light clutter components from multispectral images. The images are processed by taking the weighted difference of two or more spectral components and preferably applying a demeaning or whitening filter to the result. The images can then be frame averaged where the appropriate corrections for motion, magnification, rotation, and translation have been applied. The resultant imagery can then be displayed to an operator or transmitted to a remote location.

Figure 4:
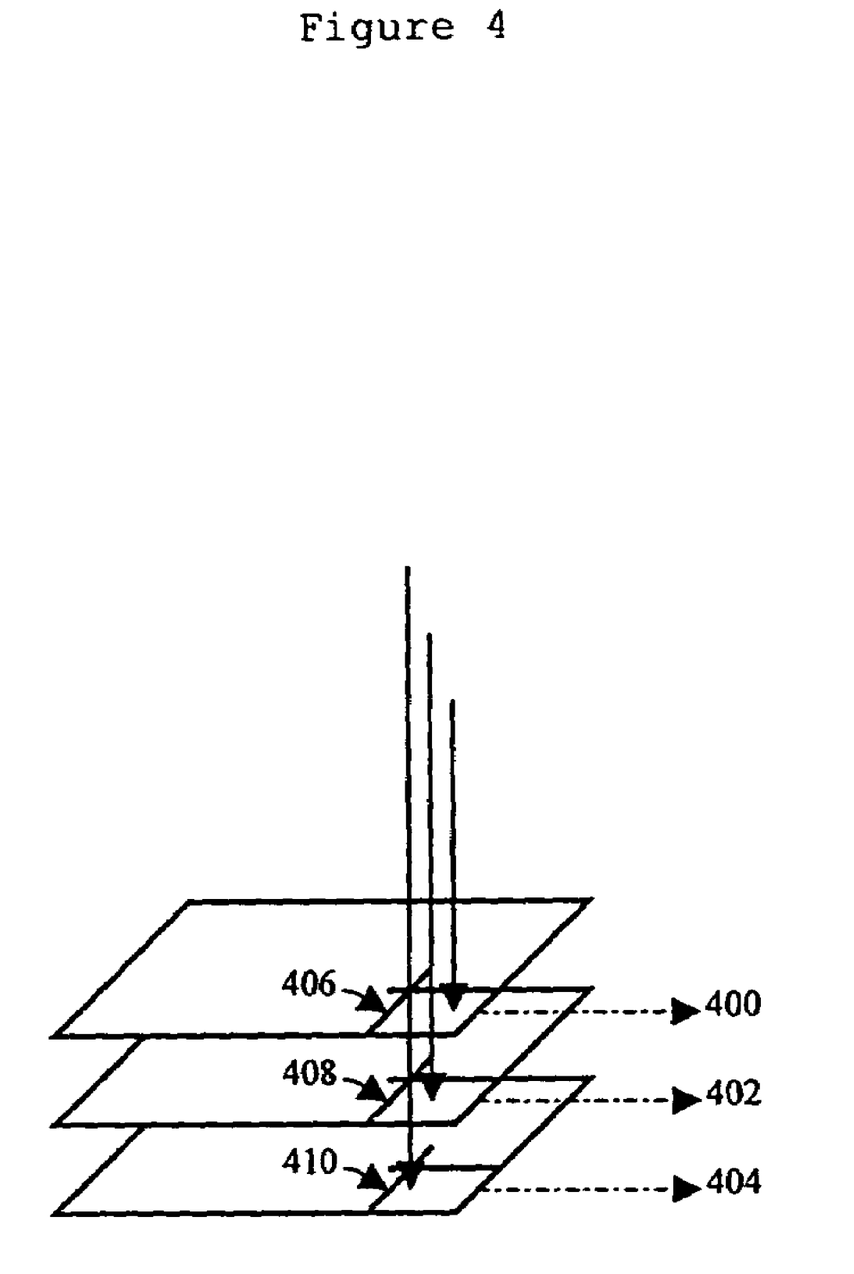
FIG. 4 is an illustration of the sensor used in this invention.

The multispectral ocean surveillance system uses a camera 218 with a sensor that eliminates the loss of processing gain in the detection of low contrast ocean objects. The new sensor (FIG. 4) is an array of three vertically stacked photodiodes (406, 408, and 410) per pixel that produces a Red, Green and Blue (RGB) output separation due to the spectral absorption of silicon as a function of depth; i.e., the uppermost layer 400 collects photons in the blue spectrum with 'green' and 'red' photons passing into the next layer. This new sensor is now commercially available. The second layer 402 collects photons in the green spectrum, and the final layer 404 then collects photons in the red part of the spectrum.

The use of the new sensor eliminates the spatial and temporal mis-registration problems inherent in all prior single and multiple device Charge Coupled Device (CCD) and Complimentary Metal Oxide Semiconductor (CMOS) camera designs. The spatial mis-registration is eliminated since the pixels are aligned vertically, and the temporal mis-registration is also eliminated since the multi-color pixels are read out simultaneously in time.

Figure 2:
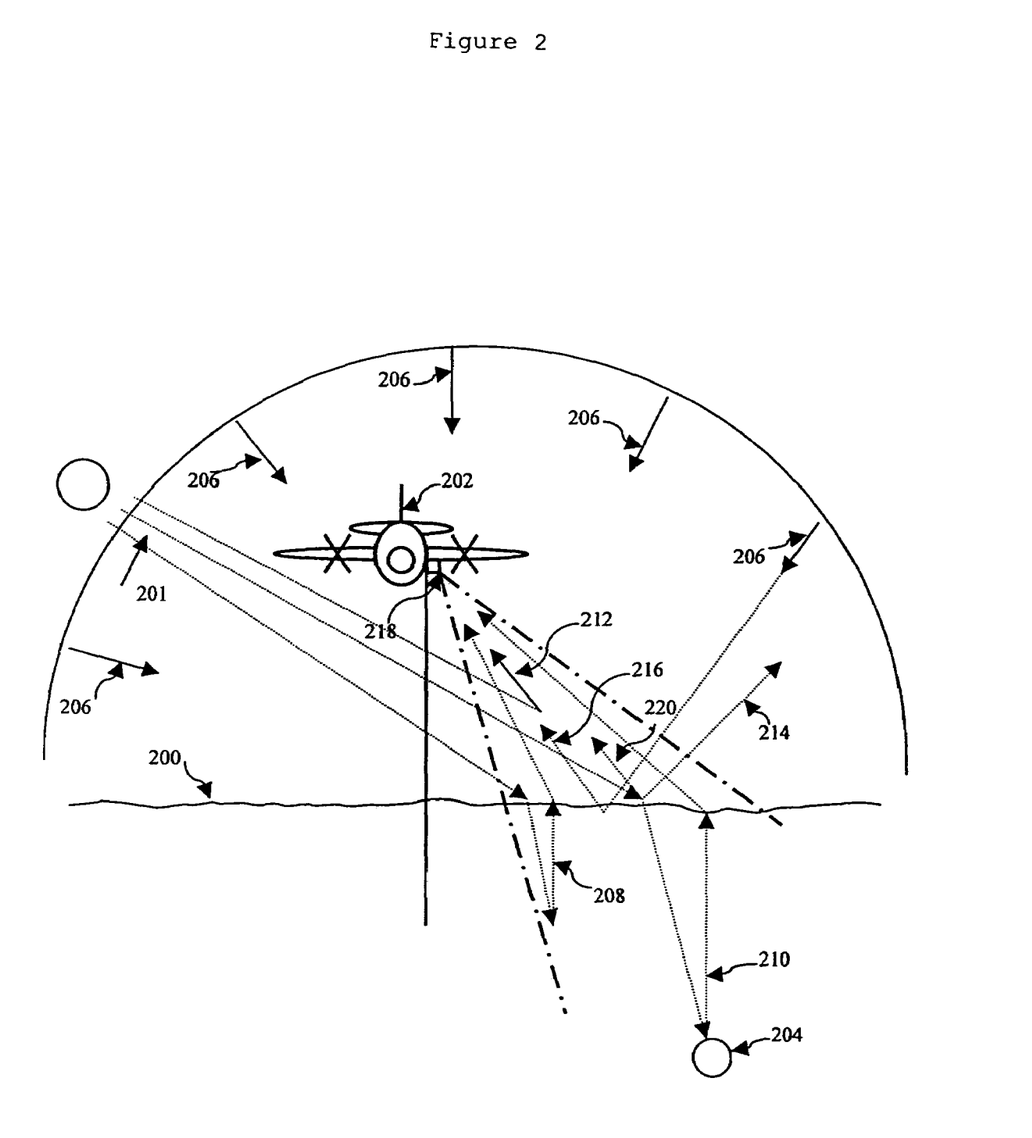
FIG. 2 is an illustration of the numerous light components seen by a multispectral imagery sensor during use over water.

The numerous components of the light collected by the imaging system over the surface of the water 200 are shown in FIG. 2. The collection platform 202 can be any type of moving aircraft, balloon, UAV, helicopter, space shuttle or satellite, as well as fixed locations such as bridges, ship masts and other sites with a clear view of the water. The collection is normally performed in the daytime, using sunlight as the source of illumination for objects of interest 204. The sensor 218 is pointed in a direction away from the solar illumination as to eliminate the direct glint reflection component 214 from contributing to the image intensity. U.S. Pat. No. 6,304,664 demonstrates a collection system using a nadir looking sensor with contribution of glint 214. This would normally result in the saturation of the sensor and the loss of object detection, at least in the area of the ocean image obscured by the glint.

There are four major components to the light collected by the sensor. The first is the hemispherical light scatter from the atmosphere 206, which is primarily due to Rayleigh scattering of sunlight 201 and is polarized. The portion of this component seen by the sensor is surface reflection 216. A polarizing filter on the sensor can be used to reduce the surface contribution of this component from the total light collected. Using a polarizing filter with this sensor affects all channels equally to enhance the object detection without a loss of processing gain. The second component is the backscattered portion 220 of the glint 214 reflections. The forward scattering component can be reduced or eliminated by pointing the system in a direction away from the surface reflection of the sun. The third component is the light contribution from atmospheric scatter 212 occurring between the water surface and the collection system. The fourth component is the upwelling light components 208 and 210 from the water column and the water plus object column, respectively.

As shown in FIG. 2, for a given color channel X, the light collected by the sensor for pixels imaging the water column only is the result of upwelling radiance from the water column 208, plus the atmospheric reflection component 212, plus the sky reflection 216 and the backscattered glint 220, or $$U_{1X} = U_W + U_A + U_S + G' \quad (1)$$

where
  $U_w$=upwelling radiance from the water column 208
  $U_o$=upwelling radiance from the water column above the object 210
  G'=residual surface reflection from glint or whitecap 220
  $U_a$=atmospheric component 212
  Us=Surface and hemispherical sky reflection component 216

The light collected by pixels imaging the water column with an object 204 is the result of the upwelling radiance from the object column 210, plus the atmospheric component 212, plus the sky reflection 216 and backscattered glint 220, or $$U_{2X} = U_O + U_A + U_S + G' \quad (2)$$

The apparent contrast of an object for a single color water penetrating channel is then defined as $$C_{OX} = \frac{U_{2X} - U_{1X}}{U_{WX}} = \frac{U_{OX} - U_{WX}}{U_{WX}} \quad (3)$$

Figure 5:
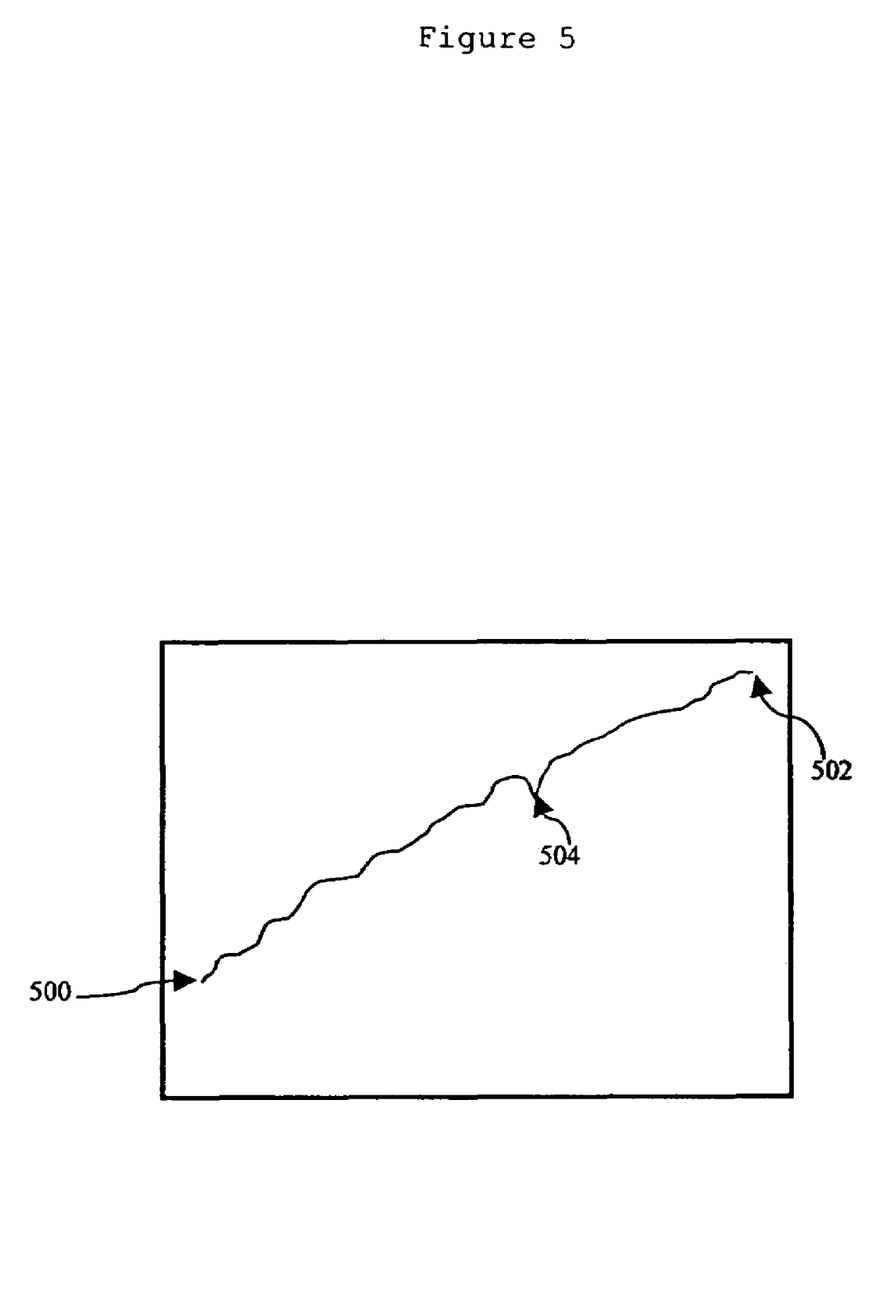
FIG. 5 illustrates the line output of a typical imaging sensor.

There are no atmospheric or surface reflection components present in the apparent contrast model. This does not imply that a dim object is detectable in the sensor output containing a large background level. Temporal averaging (on the order of seconds) of multiple frames of data for a single color system can be used to reduce surface reflection clutter for fixed location objects from a fixed platform, but does not reduce the upwelling clutter component. As shown in FIG. 5, the sensor line output being integrated has a high background level intensity and the image has a large range between the brightest 502 and the dimmest portions 500 of the image with a dim object 504 embedded in the background. Typical digital values of the brightest and dimmest values for a line output are 9600 and 5500 respectively in a 14-bit system (16384 counts), while the object may have a typical deviation from the line value of a few hundred digital counts. Removing the background to improve the visibility and hence detection of surface or underwater objects may be performed by the following technique.

A second color channel Y can be chosen that is relatively water non-penetrating such that the object contrast is weak or absent. The apparent contrast of the object for this channel is $$C_{OY} = \frac{U_{OY} - U_{WY}}{U_{WY}} \quad (4)$$

Figure 3:
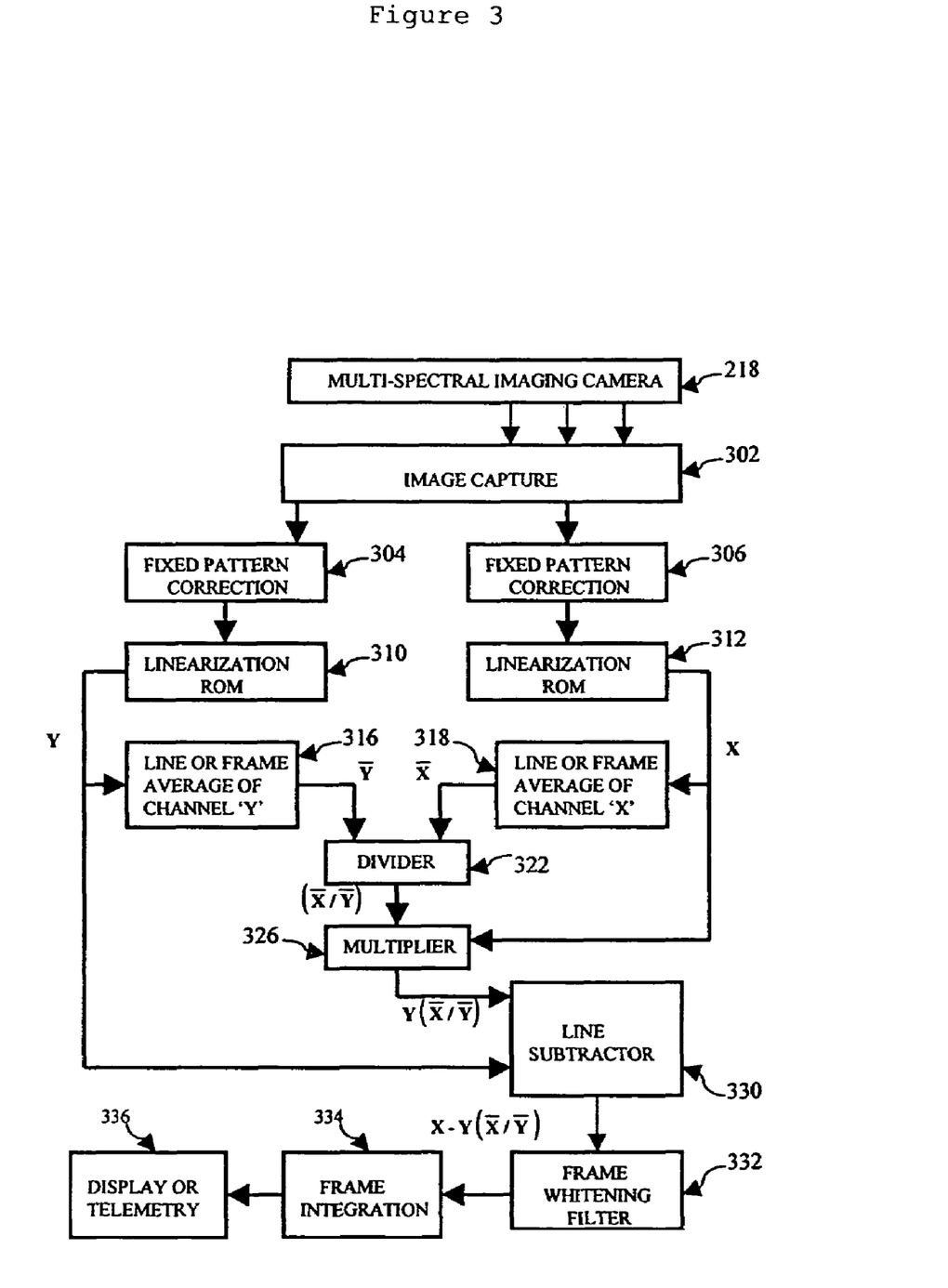
FIG. 3 illustrates the process used to obtain the low contrast multispectral images.
Figure 6A:
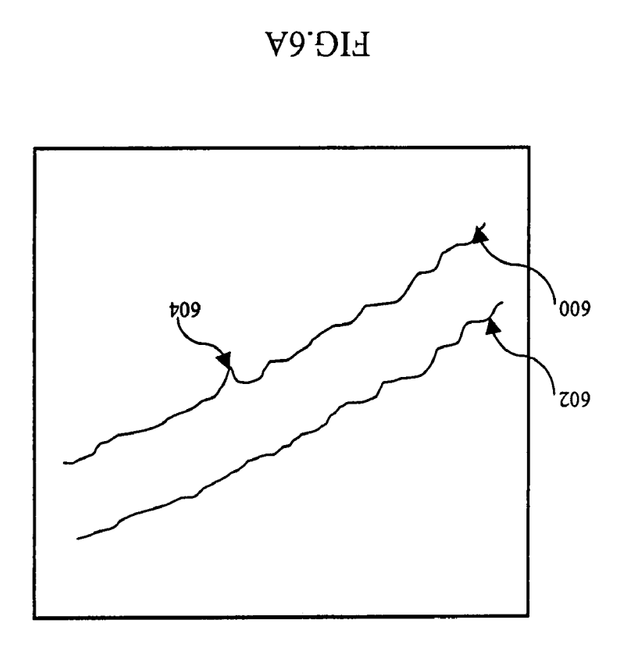
FIG. 6A is an illustration of typical line outputs for a two-color camera.

As seen in FIG. 6A, a typical line output for channel X 600 has a large background level that contains object 604. The line output for a second channel Y 602 also has a large background level but contains a weak or absent object. The line outputs from the two channels (600 and 602) are highly correlated except for the object. This implies that subtraction of the two line outputs can be used to enhance the detection of the low contrast object. Since the two line outputs have different average values, a weighting factor must first be calculated that normalizes the line difference 606. The average value of line X (600) and line Y (602) is determined. The weighting factor W (322) is then computed as the ratio of the two line or frame averages, or $$W = \overline{X}/\overline{Y} \quad (5)$$

The values of line output Y are then multiplied by this weighting factor and subtracted from the line output from channel X to form a line difference 330.

$$\text{Line Difference} = X - Y(\overline{X}/\overline{Y}) \quad (6)$$

Figure 6B:
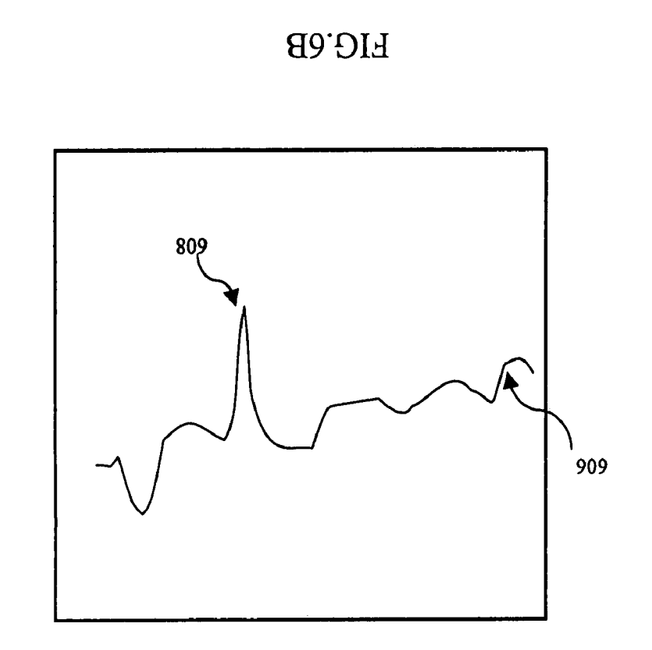
FIG. 6B illustrates the line output of a difference channel described in this invention.

As seen in FIG. 6B, by taking the weighted difference 606 between the highly correlated imagery in the two channels, one obtains low contrast object detection 608 based on the inherent contrast between the water and the object in the difference of the two channels. This process significantly amplifies the object contrast 608 against the residual background clutter. The detection process is greatly enhanced by the background reduction and the typical weak signal amplification by a factor of 30 or more.

The signal level in the difference channel is $$\text{SIGNAL} = K(C_{OY} - C_{OX})U_W \quad (7)$$

where K is a proportional constant. The strength of the object detection signal available in the difference channel is directly proportional to the difference between the apparent contrasts of the object in the two channels.

The two channel multispectral process is shown in FIG. 3. The digitized outputs of the multispectral sensor 218 are first captured 302 and stored in the memory of a frame grabber card. Two of the three available colors, X and Y, are selected for the processing that follows. The fixed pattern noise of the sensor is measured in the three channels by placing the lens cap on the camera, taking multiple frames of data, and storing the average resultant fixed pattern noise for the channels in memory. During subsequent image capture, the images subtract the fixed pattern 304 and 306 from the respective color before further processing.

Sensors exhibit a roughly linear response to the light input; i.e., the output signal doubles for a doubling of the intensity of light on the sensor. Deviation from this behavior is a non-linear response, which is measured for each pixel. A set of curve fitting coefficients is calculated for each pixel or class of pixels. These coefficients are then used to calculate the correction to be applied to each pixel during frame readout, and are stored in a ROM 310 and 312 table lookup.

The average values of each line or frame 316 and 318 are computed for each color. A ratio 322 of the average values for the two selected colors is computed to determine the weighting factor to be multiplied 326 by one of the color outputs. This weighted output is then subtracted from the other channel by a line subtractor 330 to produce the difference channel line output.

Frames are built up from the difference channel line output. A local demeaning or whitening filter 332 is then applied to the resultant images on a frame-by-frame basis. This process acts to further flatten the image by removing the local mean and tends to Gaussianize the image. This process increases the Probability of Detection (PD) and lowers the False Alarm Rate of the detection process. Additional processing on the resultant imagery 334 currently used in the industry such as frame averaging where the frames have been corrected for motion during the stack and add process can now be implemented, and the resultant processed imagery can be displayed or transmitted 336 to a remote site for viewing.

In a preferred embodiment of this invention (FIG. 7), the camera comprises a sensor 700, a random access memory (RAM) 702, a read only memory (ROM) 704, and a multiple central processing units (CPU) 706. The processed images can then be displayed on a monitor or LCD screen for viewing 708, as well as archived on a data storage unit 710 for later retrieval.

Figure 7:
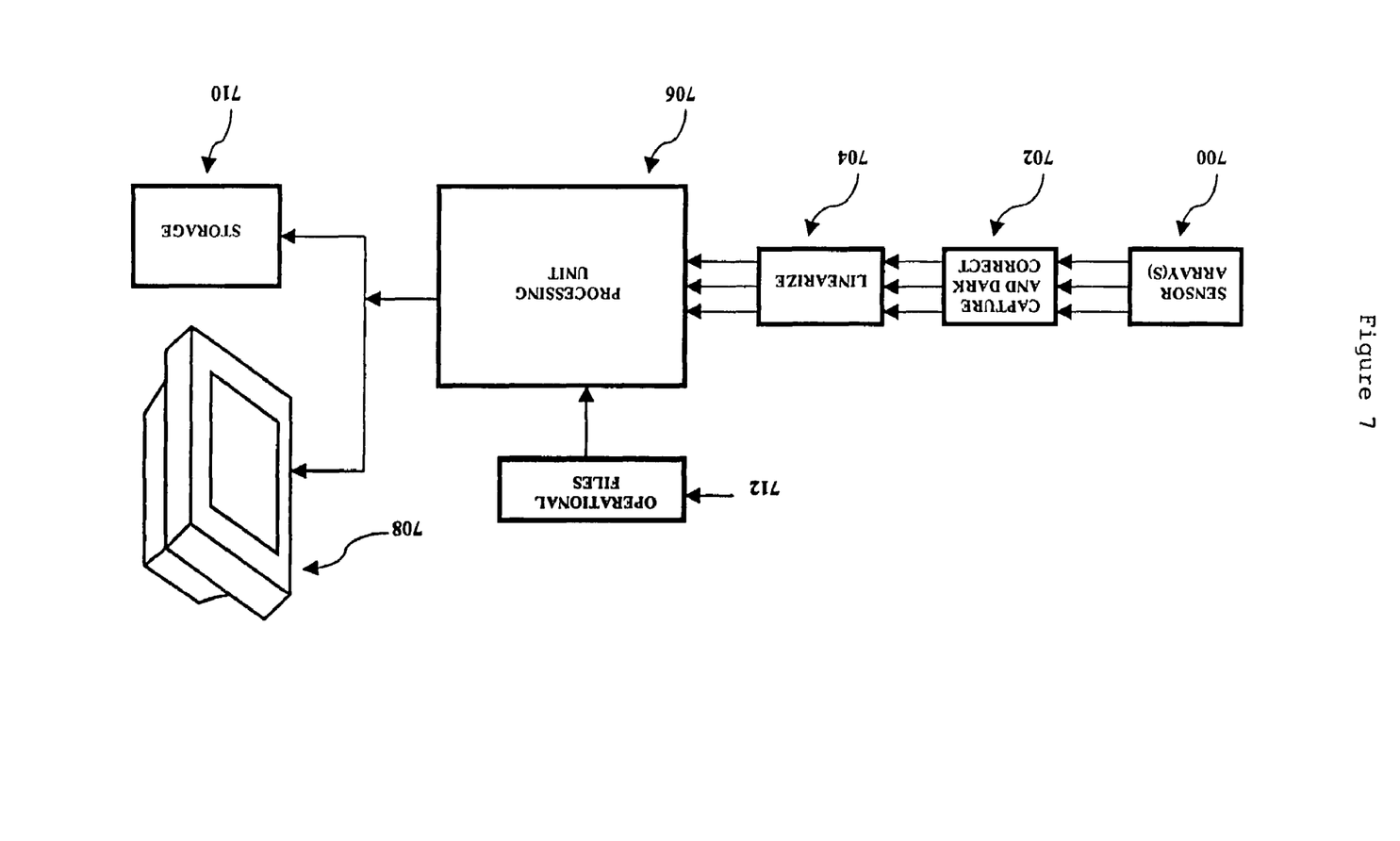
FIG. 7 is a schematic diagram of a camera in one embodiment of the invention.

The parallel multispectral output from the sensor 700 is captured and fixed pattern corrected in unit 302, 702 which can be RAM, an application specific integrated circuit (ASIC), or a field programmable logic unit (FPGA). The multiple signals are linearized through a look up table stored in unit 312, 704, which may be ROM, an ASIC, or a FPGA. These signals are then processed 706 by multiple CPUs, multiple digital signal processors (DSP), multiple FPGA's, or multiple ASIC's.

The algorithms, operating system, and system control files are stored in an operational file folder 712 that is downloaded to the appropriate units upon power turn on of the system. The algorithms and system control functions are then executed by the appropriate CPU, DSP, FPGA, or ASIC.

I claim:

1. An imaging system for detecting an object on or below a water surface, the imaging system comprising:
    a multispectral optical sensor that separates a received unprocessed image of the object into a first unprocessed image and a second unprocessed image that is spatially and temporally registered with the first unprocessed image, and that generates a first signal corresponding to the first unprocessed image and a second signal corresponding to the second unprocessed image;
    a processing unit that receives said first and second signals and manipulates said first and second signals by taking a weighted difference of said first and second signals to generate a third signal corresponding to a processed image; and
    a monitor that receives the third signal and displays the processed image;
    wherein the processing unit is operably connected to the multispectral optical sensor and to the monitor; and
    wherein the first unprocessed image is in a first frequency bandwidth and the second unprocessed image is in a second frequency bandwidth that is less water-penetrating than the first frequency bandwidth.

2. The imaging system of claim 1, wherein said multispectral optical sensor is a vertically stacked photodiode array.

3. The imaging system of claim 1, wherein said processing unit further manipulates said first and second signals by performing a fixed pattern correction.

4. The imaging system of claim 1, wherein said processing unit further manipulates said first and second signals by performing an image integration function.

5. The imaging system of claim 1, wherein said processing unit further manipulates said first and second signals by performing a sensor linearity correction.

6. The imaging system of claim 1, wherein said processing unit manipulates said third signal by performing a demeaning filter function.

\* \* \* \* \*